United States Patent
Boulanger et al.

(10) Patent No.: US 10,481,858 B2
(45) Date of Patent: Nov. 19, 2019

(54) GENERATING PERSONALIZED AUDIO CONTENT BASED ON MOOD

(71) Applicant: Harman International Industries, Incorporated, Stamford, CT (US)

(72) Inventors: Adam Boulanger, Palo Alto, CA (US); Joseph Verbeke, San Francisco, CA (US); Stefan Marti, Oakland, CA (US); Davide Di Censo, Sunnyvale, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 15/833,997

(22) Filed: Dec. 6, 2017

(65) Prior Publication Data

US 2019/0171409 A1   Jun. 6, 2019

(51) Int. Cl.
*G06F 3/16* (2006.01)
*G10L 25/63* (2013.01)
(Continued)

(52) U.S. Cl.
CPC .......... *G06F 3/165* (2013.01); *G06F 16/635* (2019.01); *G06F 16/637* (2019.01); *G06F 16/638* (2019.01); *G06F 16/68* (2019.01); *G10L 25/63* (2013.01); *H04H 60/12* (2013.01); *H04H 60/16* (2013.01); *H04H 60/33* (2013.01); *H04H 60/35* (2013.01); *H04H 60/45* (2013.01);
(Continued)

(58) Field of Classification Search
CPC .............. G06F 3/165; G06F 17/30761; G06F 17/30766; G06F 17/30769; G06F 17/30749; H04R 3/12; H04R 2499/13; G10L 25/63; H04H 60/12; H04H 60/16; H04H 60/33; H04H 60/35; H04H 60/45; H04H 60/46; H04H 60/49; H04H 60/59; H04H 60/65
USPC .............................................. 700/94; 381/86
See application file for complete search history.

(56) References Cited

U.S. PATENT DOCUMENTS 6,330,337 B1 * 12/2001 Nicholson .............. H04B 1/207
                                                          381/302
7,460,919 B2 * 12/2008 Hirayama ............ G10H 1/0041
                                                          381/107
(Continued)

FOREIGN PATENT DOCUMENTS

EP        2 043 087 A1      4/2009

OTHER PUBLICATIONS

European Search Report for application No. 18210296.2 dated Apr. 26, 2019.

*Primary Examiner* — Jesse A Elbin
(74) *Attorney, Agent, or Firm* — Artegis Law Group, LLP

(57) ABSTRACT

In one embodiment, a personalization application provides emotionally personalized audio content to co-located users. In operation, the personalization application acquires first personalized audio content for a first user based on an emotional state associated with the first user. The personalization application then causes a first audio device associated with the first user to output the first audio content. In addition, the personalization application causes a second audio device associated with a second user that is co-located with the first user to output second audio content while the first audio devices outputs the first audio content. Notably, the second audio content is different from the first audio content.

19 Claims, 4 Drawing Sheets

(51) Int. Cl.
  *H04H 60/33*    (2008.01)
  *H04H 60/35*    (2008.01)
  *H04H 60/45*    (2008.01)
  *H04H 60/46*    (2008.01)
  *H04H 60/12*    (2008.01)
  *H04H 60/59*    (2008.01)
  *H04H 60/16*    (2008.01)
  *H04H 60/49*    (2008.01)
  *H04H 60/65*    (2008.01)
  *G06F 16/68*    (2019.01)
  *G06F 16/635*   (2019.01)
  *G06F 16/638*   (2019.01)
  *G10H 1/00*     (2006.01)
  *G06K 9/00*     (2006.01)
  *H04R 3/12*     (2006.01)

(52) U.S. Cl.
  CPC ............ *H04H 60/46* (2013.01); *H04H 60/49* (2013.01); *H04H 60/59* (2013.01); *H04H 60/65* (2013.01); *H04R 3/12* (2013.01); *H04R 2499/13* (2013.01)

(56) References Cited

U.S. PATENT DOCUMENTS

| | | |
|---|---|---|
| 9,380,383 B2 * | 6/2016 | Brenner ................ H04H 60/47 |
| 9,489,169 B2 * | 11/2016 | Tschirhart ............. G06F 3/0482 |
| 2001/0038698 A1 | 11/2001 | Breed et al. |
| 2004/0237759 A1 * | 12/2004 | Bill .................. G06F 17/30017 84/668 |
| 2006/0126452 A1 | 6/2006 | Yamashita et al. |
| 2006/0262935 A1 | 11/2006 | Goose et al. |
| 2017/0262256 A1 * | 9/2017 | Rajendran ............ G06F 16/636 |

\* cited by examiner

GENERATING PERSONALIZED AUDIO CONTENT BASED ON MOOD

BACKGROUND

Field of the Various Embodiments

The various embodiments relate generally to audio systems and, more specifically, to generating personalized audio content based on mood.

Description of the Related Art

Vehicles typically include audio systems that provide audio information and entertainment to the occupants of the vehicle. For example, an audio system could enable occupants to receive audio content from a radio, participate in a cell phone call, receive navigation commands from a navigation subsystem, receive safety warnings from an advanced driver assistance system, and so forth. One limitation of many audio systems is that the same audio content is received by all occupants of the vehicle. Consequently, the audio system may be unable to address the listening preferences of all occupants simultaneously.

For example, a driver of a vehicle could be in a happy mood and, as a result, could have a preference for up-beat songs. By contrast, a back-seat passenger could be in an unhappy mood that is exacerbated by the up-beat songs. In another example, the driver could be driving the vehicle during low light conditions along a congested, windy road while the passengers are listening to a football game. In such a scenario, the driver may become distracted by the football game and fail to devote enough mental resources to the primary driving task of operating the vehicle in a safe manner.

To improve the listening experiences of each occupant, some vehicles include audio systems that provide different sound zones. In such audio systems, each sound zone may be associated with a different seating position within the vehicle. Typically, at each seating position, directional speakers are embedded in the head rests and/or overhead the vehicle occupants. The audio system is then able to provide personalized audio content to the different sound zones based on manual selections that are made by the individual occupants of the vehicle. For example, a driver could specify that the audio system provide only navigation and safety commands to the driver seating position, while the front passenger could specify that the audio system provide a rock music broadcast to the front passenger seating position.

One limitation of providing personalized audio content based on manual selections is that the personalized audio content does not necessarily optimize the listening experiences of all the occupants. For example, an occupant may not understand how to manually select personalized audio content or may find manually selecting personalized audio content to be tedious and/or time consuming. In another example, an occupant may not understand what type of audio content would likely optimize their listening experience and/or the safety of the vehicle (e.g., a drowsy driver may manually select love songs that exacerbate their drowsiness). In yet another example, an occupant may not have the ability to modify a particular type of audio content (e.g., a harsh audio notification or speech content) and/or may not have access to a type of audio content that suits their current listening preferences.

As the foregoing illustrates, more effective techniques for providing personalized audio content would be useful.

SUMMARY

One embodiment sets forth a method for providing personalized audio content. The method includes acquiring first personalized audio content that is based on a first emotional state associated with a first user; causing a first audio device associated with the first user to output the first audio content; and causing a second audio device associated with a second user that is co-located with the first user to output second audio content while the first audio device outputs the first audio content, where the second audio content is different from the first audio content.

Further embodiments provide, among other things, a system and a computer-readable medium configured to implement the method set forth above.

At least one advantage of the disclosed techniques is that an in-vehicle audio system can deliver different, emotionally personalized audio content to individual sound zones, where each sound zone is associated with a different occupant of a vehicle. Because the emotionally personalized audio content delivered to each occupant is automatically optimized based on the mood of the occupant, each occupant is not required to make manual adjustments to improve their listening experience. Further, the in-vehicle audio system typically has access to audio modification techniques that are not accessible to the occupants.

BRIEF DESCRIPTION OF THE DRAWINGS

So that the manner in which the above recited features can be understood in detail, a more particular description of the various embodiments, briefly summarized above, may be had by reference to certain embodiments, some of which are illustrated in the appended drawings. It is to be noted, however, that the appended drawings illustrate only typical embodiments and are therefore not to be considered limiting of scope, for the contemplated embodiments may admit to other equally effective embodiments.

DETAILED DESCRIPTION

In the following description, numerous specific details are set forth to provide a more thorough understanding of the various embodiments. However, it will be apparent to one of skill in the art that various embodiments may be practiced without one or more of these specific details.

Vehicle Overview

Figure 1:
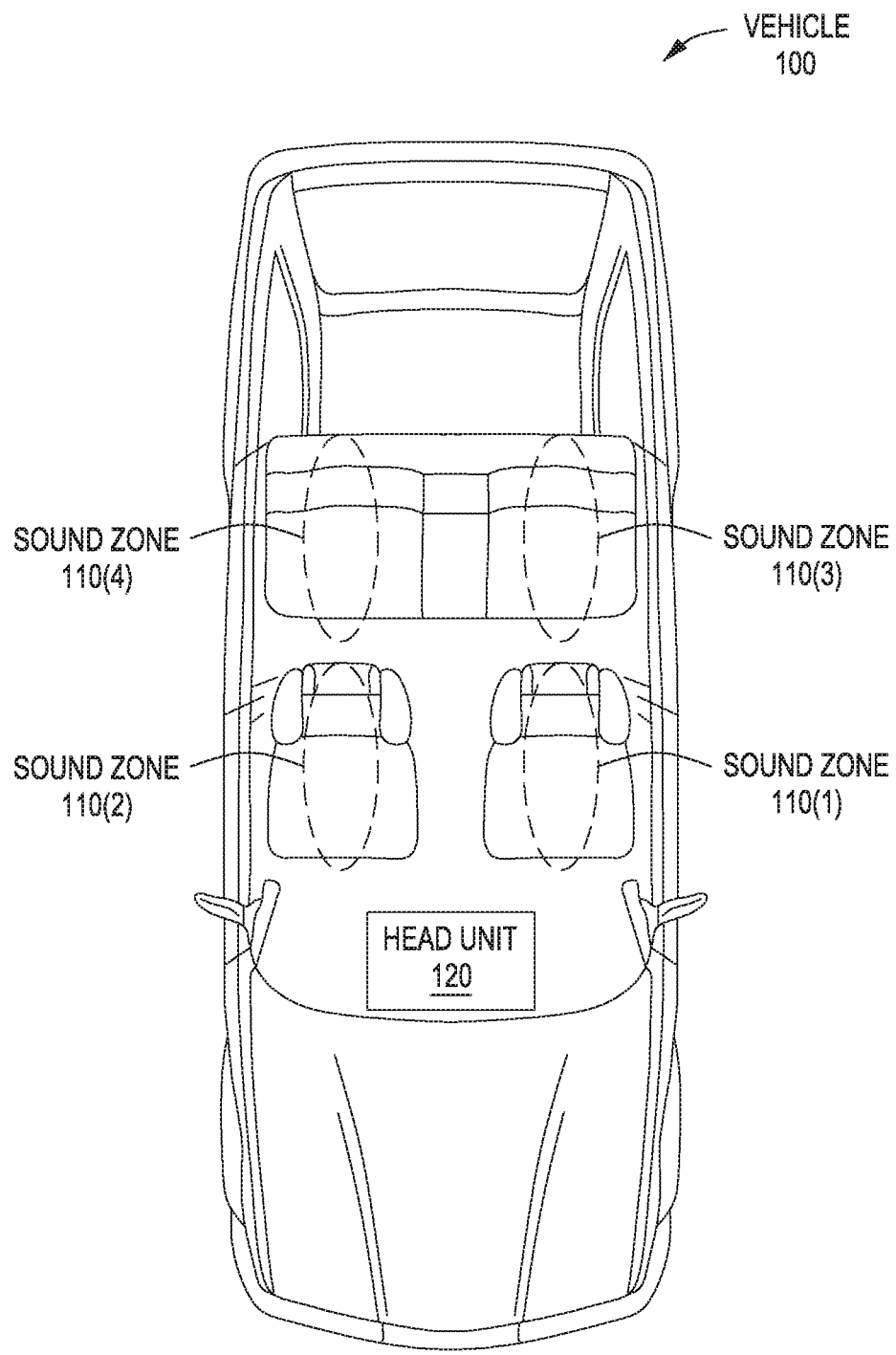
FIG. 1 illustrates a vehicle that is configured to implement one or more aspects of the various embodiments.

FIG. 1 illustrates a vehicle 100 that is configured to implement one or more aspects of the various embodiments. The vehicle 100 includes, without limitation, any number of sound zones 110 and a head unit 120. For explanatory purposes, multiple instances of like objects are denoted with reference numbers identifying the object and parenthetical numbers identifying the instance, where needed.

Each of the sound zones 110 is a semi-private audio region that is associated with a different seating position within the vehicle 100 and, consequently, a different occupant of the vehicle 100. As shown, the sound zone 110(1) is associated with the driver seating position, the sound zone 110(2) is associated with the front passenger seating position, the sound zone 110(3) is associated with one rear passenger seating position, and the sound zone 110(4) is associated with another rear passenger seating position. In alternate embodiments, the vehicle 100 may include any number of sound zones 110, and each sound zone 110 may be associated with any number of occupants.

Each of the sound zones 110 is enabled via any number of associated audio devices that are included in an audio system. For instance, in some embodiments, at each seating position, the audio system includes directional speakers that are embedded in the head rests and overhead. In other embodiments, the occupant at each seating position wears a wired or wireless earbud. The head unit 120 includes, among other things, an audio delivery application (not shown) that controls the audio system. The audio application may implement any number of techniques for delivering directed or spatialized sound via the audio devices associated with the sound zones 110. Examples of delivery techniques include, without limitation, ultrasonic techniques, phase-array techniques, geometric techniques based on speaker placement, digital signal processing techniques (e.u., advanced equalization, noise cancellation, and masking). As persons skilled in the art will recognize, the amount of privacy that each of the sound zones 110 may be configured to provide to the occupants may be limited, at least in part, by the number and type of audio devices and delivery techniques.

Figure 2:
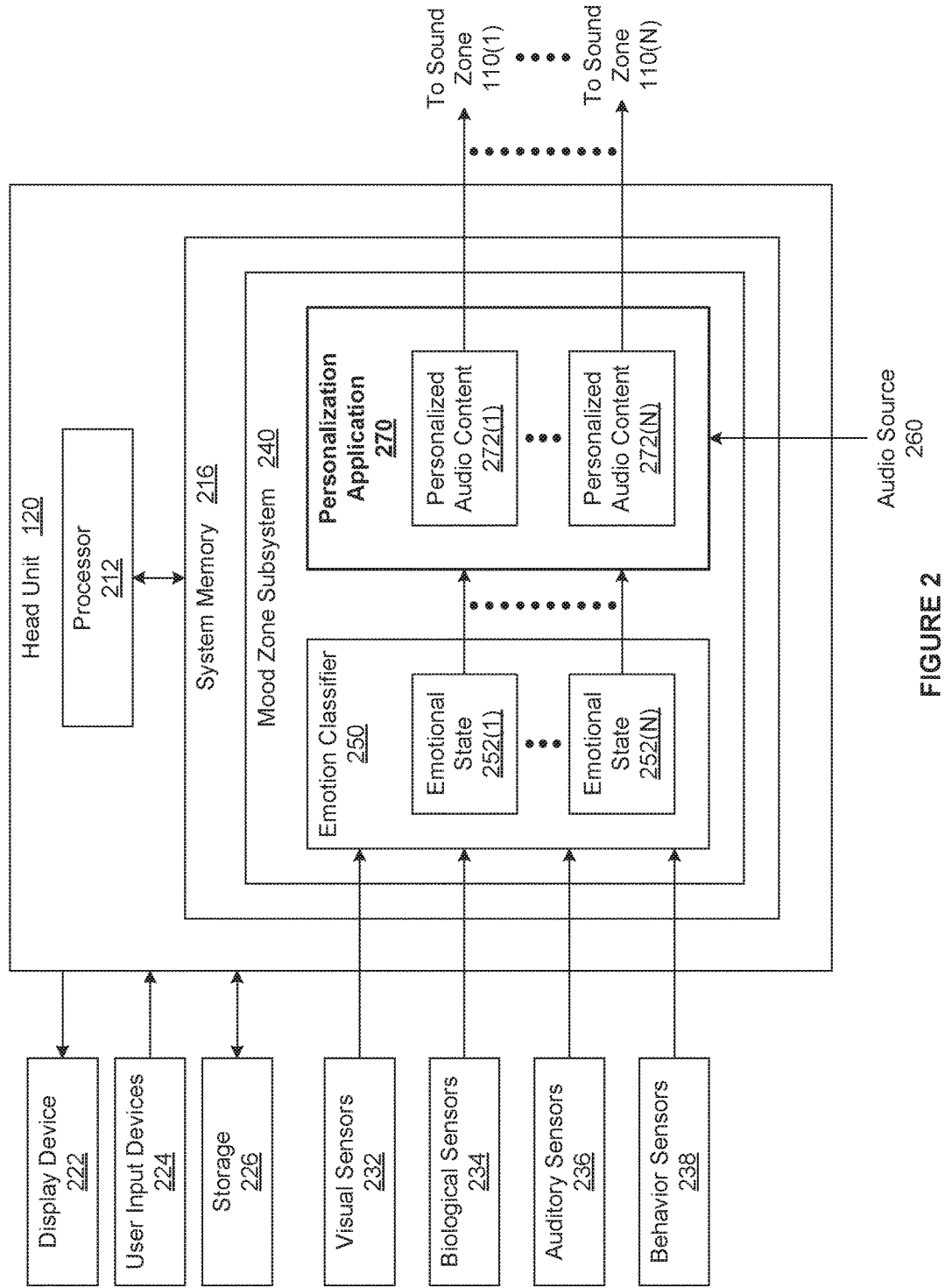
FIG. 2 is a more detailed illustration of the head unit of FIG. 1, according to various embodiments.

FIG. 2 is a more detailed illustration of the head unit 120 of FIG. 1, according to various embodiments. As shown, the head unit 120 includes, without limitation, a processor 212 and a system memory 216. The processor 212 and the system memory 216 may be implemented in any technically feasible fashion. For example, and without limitation, in various embodiments, any combination of the processor 212 and the system memory 216 may be implemented as a stand-alone chip or as part of a more comprehensive solution that is implemented as an application-specific integrated circuit (ASIC) or a system-on-a-chip (SoC).

The processor 212 generally comprises a programmable processor that executes program instructions to manipulate input data. The processor 212 may include any number of processing cores, memories, and other modules for facilitating program execution. The processor 212 may receive input via any number of user input devices 224 and generate pixels for display on the display device 222. The user input devices 224 may include various types of input devices, such as buttons, a microphone, cameras, a touch-based input device integrated with a display device 222 (i.e., a touch screen), and other input devices for providing input data to the head unit 120.

The head unit 120 may support any number of input and output data types and formats as known in the art. For example, and without limitation, in some embodiments, the head unit 120 may include built-in Bluetooth for hands-free calling and audio streaming, universal serial bus (USB) connections, speech recognition, rear-view camera inputs, video outputs for any number and type of displays, and any number of audio outputs. In general, any number of sensors, displays, receivers, transmitters, etc. may be integrated into the head unit 120 or may be implemented externally to the head unit 120. External devices may communicate with the head unit 120 in any technically feasible fashion. In alternate embodiments, the vehicle 100 may include any number of standalone units that implement any amount of the functionality described herein for the head unit 120. The standalone units are not integrated with the head unit 120 and, in some embodiments, may replace the head unit 120.

The system memory 216 generally comprises storage chips such as random access memory (RAM) chips that store application programs and data for processing by the processor 212. In various embodiments, the system memory 216 includes non-volatile memory such as optical drives, magnetic drives, flash drives, or other storage. In some embodiments, a storage 226 may supplement or replace the system memory 216. The storage 226 may include any number and type of external memories that are accessible to the processor 212. For example, and without limitation, the storage 226 may include a Secure Digital Card, an external Flash memory, a portable compact disc read-only memory (CD-ROM), an optical storage device, a magnetic storage device, or any suitable combination of the foregoing.

In addition to or instead of the audio delivery application, the system memory 216 may include any number and type of other applications. For instance, in some embodiments, the system memory 216 may include an entertainment subsystem, a navigation subsystem, and an advanced driver assistance subsystem (ADAS), to name a few. The entertainment subsystem includes software that controls any number and type of entertainment components, such as an AM/FM radio, a satellite radio, an audio and video computer files player (e.g., MP3 audio files player), an optical media player (e.g., compact disc (CD) player), and so forth. The navigation subsystem includes any number and type of applications that enable a driver to efficiently navigate the vehicle. For example, the navigation subsystem may include maps, direction routing software, and the like. The ADAS includes functionality designed to increase driver safety, automate driving tasks, and the like. In some embodiments, the functionality of the audio delivery application may be integrated into or distributed across any number of other applications (e.g., an infotainment system).

In general, a conventional audio delivery application that supports multiple sounds zones 110 provides conventionally personalized audio content to the different sound zones 110 based on manual selections that are made by the individual occupants of the vehicle. For example, a driver could manually specify that the audio system provide only navigation and safety commands to the driver seating position, while the front passenger could manually specify that the audio system provide a rock music broadcast to the front passenger seating position.

One limitation of providing conventionally personalized audio content based on manual selections is that the conventionally personalized audio content does not necessarily optimize the listening experiences of all the occupants. For example, an occupant may not understand how to manually select conventionally personalized audio content or may find manually selecting conventionally personalized audio content to be tedious and/or time consuming. In another example, an occupant may not understand what type of audio content would likely optimize their listening experience and/or the safety of the vehicle (e.g., a drowsy driver may manually select love songs that exacerbate their drowsiness). In yet another example, an occupant may not have the ability to manually modify a particular type of audio content (e.g., a harsh audio notification or speech content) and/or may not have access to a type of audio content that suits their current listening preferences.

Implementing Individual Mood Zones

To increase both the enjoyment and safety of the occupants of the vehicle 100, the system memory 216 includes, without limitation, a mood zone subsystem 240. As shown, the mood zone subsystem 240 includes, without limitation, an emotion classifier 250 and a personalization application 270. For each of the occupants of the vehicle 100, the emotion classifier 250 generates an emotional state 252 based on sensor data. Subsequently, for each of the occupants, the personalization application 270 generates personalized audio content 272 based on the emotional state 252 associated with the occupant and source audio content received from any number of audio sources 260. Finally, for each of the occupants, the personalization application 270 configures the audio system to deliver the personalized audio content 272 associated with the occupant to the sound zone 110 associated with the occupant. In this fashion, the mood zone subsystem 240 automatically delivers personalized audio content 272 that reliably enhances the listening experiences of the occupants.

As shown, the emotion classifier 250 receives data from any number of visual sensors 232, biological sensors 234, auditory sensors 236, and behavior sensors 238. In alternate embodiments, the emotion classifier 250 receives any amount and type of data that is indicative of the mood(s) of one or more occupants of the vehicle 100 from any number and type of devices and/or applications.

The visual sensors 232 provide image data of facial expressions, body postures, body positions, etc. that may be indicative of the mood(s) of one or more of the occupants of the vehicle 100. In some embodiments, the visual sensors 232 include, without limitation, any number and combination of infrared cameras, RGB cameras, camera arrays that provide multiple perspectives on body or head of an occupant, and depth cameras that sense body posture and body positioning.

The biological sensors 234 provide biological data that may correlate with the mood(s) of one or more of the occupants of the vehicle 100. In some embodiments, the biological sensors 234 include, without limitation, any number and combination of Galvanic skin response sensors that measure emotional arousal, image sensors that detect blood oxygen levels, heat sensors that detect blood flow, optical sensors that detect blood flow, electroencephalography sensors that detect surface potentials of brains, magnetoencephalography sensors that detect neural activities, and the like.

The auditory sensors 236 provide audio data that may indicate the mood(s) of one or more of the occupants of the vehicle 100. More precisely, the words spoken by an individual as well as the way the individual speaks a given phrase are often indicative of sentiment and mood. In some embodiments, the auditory sensors 236 include, without limitation, any number and combination of microphones, microphone arrays, and the like.

The behavior sensors 238 provide tactile data, electronic activity data, etc. that provide insight into the activities of individuals around the vehicle 100 as well as occupants within the vehicle 100. The detected activities may be indicative of the mood(s) of one or more of the occupants of the vehicle 100. For instance, in some embodiments, the behavior sensors 238 include, without limitation, any number of mobile usage sensors that detect usage of mobile devices. In general, a pattern of applications used by an occupant may correlate to a mood. For instance, if an application is categorized as a fun, social application, then the use of the application may correlate with a joyful, social mood.

In the same or other embodiments, the behavior sensors 238 include, without limitation, pressure sensors, touch sensors, acoustic sensors, and button press sensors that indicate how an occupant is placing their hands. The tactile data may be indicative of the mood of the occupant. For example, tactile data that an occupant is pressing keys with unnecessary force may indicate an agitated mood.

After receiving data from the visual sensors 232, biological sensors 234, auditory sensors 236, and behavior sensors 238, the emotion classifier 250 processes the data. As part of processing the data, the emotion classifier 250 may execute any number of algorithms, such as natural language processing algorithms, sentiment analysis, and speech analysis. Further, the emotion classifier 250 may perform disambiguation operations based on a combination of data received from different sensor types. Subsequently, for each occupant, the emotion classifier 250 determines the emotional state 252 associated with the user based on the processed data. The emotion classifier 250 may determine the emotional states 252 in any technically feasible fashion. For example, the emotion classifier 250 could implement any number and type of heuristics, rules, and/or machine learning algorithms, in any combination, to determine the emotional states 252.

For instance, in some embodiments, the emotion classifier 250 comprises a support vector machine, Bayes classifier, or a Markov chain. In other embodiments, the emotion classifier 250 includes an emotion categorization model that maps facial images, biological data, and application usage data to an emotional state 252. In some embodiments, the emotion classifier 250 correlates processed data to previously observed data that is associated with a known emotion. In the same or other embodiments, the emotional classifier 250 implements statistical algorithms to determine the emotional states 252.

Figure 3:
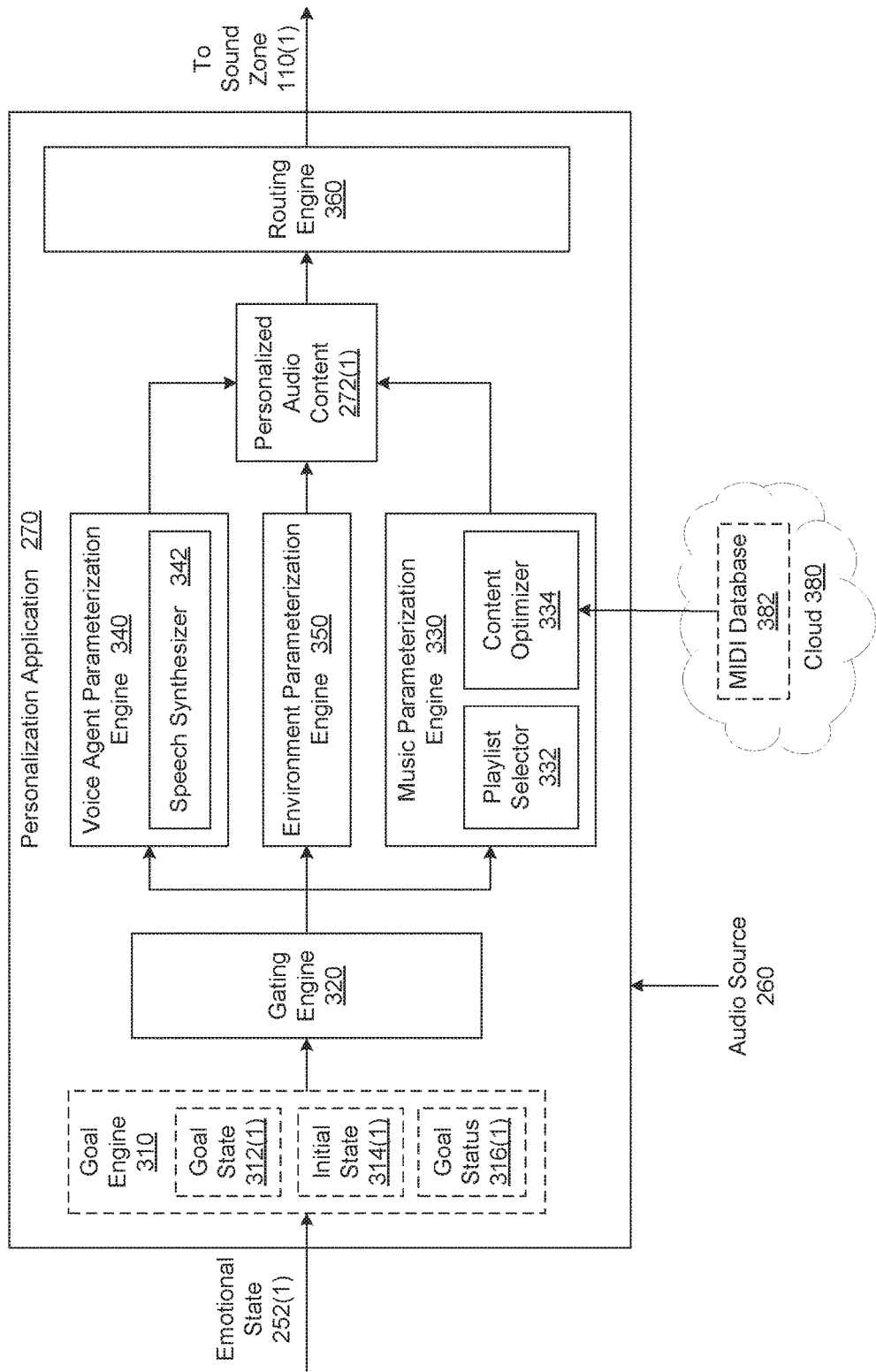
FIG. 3 is a more detailed illustration of the personalization application of FIG. 2, according to various embodiments.

As described in greater detail in conjunction with FIG. 3, for each of the occupants, the personalization application 270 generates personalized audio content 272 based on the emotional state 252 associated with the occupant and source audio content received from any number of audio sources 260. Examples of the audio sources 260 include voice agents (e.g., a navigation subsystem), audio and video computer file players, microphones configured to detect voices of occupants in the vehicle 100, warnings and errors generated by an ADAS, engine noise, etc. Each of the audio sources 260 may be located inside the head unit 120 or outside the head unit 120.

Finally, for each of the occupants, the personalization application 270 configures the audio system to deliver the associated personalized audio content 272 to the sound zone 110 associated with the occupant. The personalization application 270 may configure the audio system to deliver the associated personalized audio content 272 in any technically feasible fashion. For example, for each of the sound zones 110, the personalization application may interface with an audio delivery application or directly configure one or more audio devices that are associated with the sound zones 110.

In alternate embodiments, the head unit 120 may include any number of system memories 216 and any number of processors 212 that are implemented in any technically feasible fashion. In various embodiments, the mood zone subsystem 240, the emotion classifier 250, and/or the personalization application 270 may be stored in any memories and execute on any processors that are implemented via any number of physical resources located in any number of physical locations. For example, the personalization application 270 could be implemented as a stand-alone application in a cloud computing environment, a distributed computing environment, a laptop, a tablet, a smartphone, and so forth.

Emotionally Personalizing Audio Content

FIG. 3 is a more detailed illustration of the personalization application 270 of FIG. 2, according to various embodiments. In general, for each of any number of occupants of the vehicle 100, the personalization application 270 generates and routes different personalized audio content 272(x) associated with the occupant based on the emotional state 252(x) associated with the individual. The personalization application 270 may generate and route the different personalized audio content 272 associated with any number of occupants concurrently, sequentially, or any combination thereof. Further, the personalization application 270 may receive, request, and/or process updated emotional states 252 and/or audio content received from the audio sources 260 continually, at discrete intervals, or in response to any number and type of criteria.

For explanatory purposes only, in the context of FIG. 3, the personalization application 270 is depicted and described as generating and routing the personalized audio content 272(1) associated with a target occupant of the vehicle 100 based on the emotional state 252(1) associated with the target occupant. As shown, the personalization application 270 includes, without limitation, a goal engine 310, a gating engine 320, a music parameterization engine 330, a voice agent parameterization engine 340, an environment parameterization engine 350, the personalized audio content 272(1), and a routing engine 360.

As depicted with dotted boxes, the goal engine 320 may be implemented in some embodiments, but may be omitted in other embodiments. Embodiments in which the goal engine 310 is implemented operate in a "goal mode" while embodiments in which the goal engine 320 is omitted operate in a "non-goal mode." In some alternate embodiments, the goal engine 320 may be configured to operate selectively in the goal mode based on any technically feasible criteria (e.g., a configurable setting).

As shown, the goal engine 310 includes, without limitation, a goal state 312(1), an initial state 314(1), and a goal status 316(1). In general, for each occupant of the vehicle 100, the goal engine 310 includes the goal state 312(x), the initial state 314(x), and the goal status 316(x) associated with the occupant. Initially, the goal engine 310 determines the goal state 312(1) based on the emotional state 252(1). The goal engine 310 may determine the goal state 312(1) in any technically feasible fashion. For example, the goal engine 310 could implement any number and type of heuristics, rules, and/or machine learning algorithms, in any combination, to generate the goal state 312(1) based on the emotional state 252(1).

In alternate embodiments, instead of generating a different goal state 312 for each of the occupants, the goal engine 310 may determine a collective goal state 312 for all of the occupants. The goal engine 310 may generate the collective goal state 312 in any technically feasible fashion and based on any number of the emotional states 252. For example, the goal engine 310 could generate the collective goal state 312 as a weighted aggregate of the emotional states 252, where the emotional states 252 associated with certain moods are more heavily weighted than the other emotional states 252.

After the goal engine 310 determines the goal state 312(1), the goal engine 310 sets the initial state 314(x) to reflect the emotional state 252(1) and the goal status 316(x) to indicate that the goal state 312(1) is a new goal state 312(1). Subsequently, as the audio system operates, the goal engine 310 receives an updated emotional state 252(1) The goal engine 310 then updates the goal status 316(1) to reflect whether the personalization application 270 is successfully transitioning the emotional state 252(1) associated with the target occupant from the initial state 314(1) to the goal state 312(1).

The goal engine 310 may also regenerate the goal state 312(1), the initial state 314(1), and the goal status 316(1) based on any regeneration criteria (e.g., when the goal state 312(1) is reached). In some alternate embodiments, the goal engine 310 includes neither the initial state 314(1) nor the goal status 316(1). In such embodiments, upon receiving a new emotional state 252(1), the goal engine 310 re-generates the goal state 312(1) based on the new emotional state 252(1). Notably, because emotions are often transitory, the goal state 312(1) may not be reached before the goal engine 310 generates a new goal state 312(1) based on a new emotional state 252(1).

The gating engine 320 determines whether the audio system is to provide audio content to the target occupant based on the emotional state 252(1). The gating engine 320 may determine whether the audio system 100 is to provide audio content to the target occupant in any technically feasible fashion. For example, if the target occupant is not the driver, then the gating engine 320 could determine whether to provide audio content to the target occupant based on whether the emotional state 252(1) indicates that the target occupant is asleep. If the personalization application 270 is operating in the goal mode, then the gating engine 320 may determine whether the audio system 100 is to provide audio content to the target occupant based on techniques that take into consideration the goal state 312, the initial state 314, and/or the goal status 316.

If the gating engine 320 determines that the audio system 100 is not to provide audio content to the target occupant, then the gating engine 320 configures the audio system to cease providing audio content to the target occupant. The gating engine 320 also ensures that the personalization application 270 does not generate the personalized audio content 272(1) until the gating engine 320 determines that the audio system is to provide audio content to the target occupant. The gating engine 320 may configure the audio system to cease providing audio content to the target occupant in any technically feasible fashion.

If, however, the gating engine 320 determines that the audio system is to provide audio content to the target occupant, then the personalization application 270 generates the personalized audio content 272(1) based on the emotional state 252(1) and, optionally, source audio content received from any number of the audio sources 260. The personalization application 270 may generate the personalized audio content 272 in any technically feasible fashion that reflects the emotional state 252(1) and portions of the source audio content that are targeted for output to the target occupant. In some embodiments in which the personalization application 270 is operating in the goal mode, the personalization application 270 may generate the personalized audio content 272 based on techniques that take into consideration the goal state 312, the initial state 314, and/or the goal status 316.

In general, the personalization application 270 implements an "emotional conditioning" process to acquire the personalized audio content 272(1) based on the emotional state 252(1). Examples of acquiring the personalized audio content 272(1) include, without limitation, selecting the personalized audio content 272(1) from a data source, generating the personalized audio content 272(1), and so forth. First, the personalization application 270 assesses the emotional state 252(1). If the personalization application 270 determines that emotional state 252(1) is optimal for the well-being (including safety) of the target occupant, then the personalization application 270 acquires the personalized audio content 272(1) that is designed to maintain the emotional state 252(1). If, however, the personalization application 270 determines that the emotional state 252(1) is not optimal for the well-being (including safety) of the target occupant, then the personalization application 270 acquires the personalized audio content 272(1) that is designed to result in a more optimized emotional state 252(1).

For example, if the emotional state 252(1) indicates that the target occupant is highly agitated, then the personalization application 270 would acquire the personalized audio content 272(1) that is designed to have a calming effect on the target occupant. In another example, if the target occupant is the driver and the emotional state 252(1) indicates that the target occupant is drowsy, then the personalization application 270 would acquire the personalized audio content 272(1) that is designed to have a stimulating effect on the target occupant.

In various embodiments, the personalization application 270 may implement any number and type of heuristics, rules, and/or machine learning algorithms in any combination, to acquire the personalized audio content 272(1) based on the emotional state 252(1) and, optionally, the audio source(s) 260. Further, the heuristics, rules, and/or machine learning algorithms may be distributed across any number of components in any technically feasible fashion. For example, the personalization application 270 could execute a machine learning algorithm that is implemented in an application (not shown) residing in a cloud 380 (e.g., encapsulated shared resources, software, data, etc.). In another example, the personalization application 270 could include a machine learning algorithm that accesses historical data associated with the target occupant and/or any number of other individuals to guide the generation of the personalized audio content 272(1).

The process of generating personalized audio content 272(1) based on source content received from the audio sources 260 and targeted for output to the target occupant is referred to herein as "parameterizing" the source content. As part of parameterizing the source content, the personalization application 270 may alter any number and type of characteristics associated with the source content. In various embodiments, examples of modifiable characteristics include, without limitation, tone, a frequency characteristic, a musical arrangement selection, an instrument selection, a pitch, a word choice, a type of information, a tone of voice, or a type of voice. The result of parameterizing the source content is referred to herein as "parameterized source content" and is included in the personalized audio content 272(1).

In some embodiments, the personalization application 270 implements different emotional conditioning operations to generate portion(s) of the personalized audio content 272(1) derived from different types of source audio content received from the audio source(s) 260. As a general matter, not all audio content received from the audio sources(s) 260 is necessarily intended for delivery to all occupants. For example, in some embodiments, one of the audio source(s) 260 may comprise a navigation subsystem that is providing navigation instructions that are intended for delivery to a driver, but not to any of the passengers of the vehicle 100. In another example, in some embodiments, one of the audio source(s) 260 may comprise a radio station that is providing audio content that is intended for delivery to all the occupants of the vehicle 100.

For each occupant, the personalization application 270 classifies each portion of the source audio content received from the audio sources(s) 260 based on the type of content as well as whether the portion of the source audio content is intended for delivery to the occupant. For example, suppose that a particular portion of the source audio content comprises music that is intended for delivery to the target occupant, but not to any other occupants of the vehicle 100. In such a scenario, for the target occupant, the personalization application classifies the portion of the source audio content as music content. By contrast, for the other occupants of the vehicle 100, the personalization application 270 classifies the portion of the source audio content as environmental sound that may be unintentionally overheard by the occupants.

The personalization application 270 may partition and classify the source audio content received from the audio sources(s) 260 in any technically feasible fashion. In some embodiments, the personalization application may partition and classify the source audio content based on the audio source 260. For example, if the audio source $260(y)$ is a navigation subsystem, then the personalization application 270 may classify the audio content received from the audio source $260(y)$ as a portion of voice agent content.

In some embodiments, the music parametrization engine 330 generates portion(s) of the personalized audio content 272 derived from music content included in the source audio content. In the same or other embodiments, the voice agent parametrization engine 340 generates portion(s) of the personalized audio content 272 derived from voice agent content included in the source audio content. In some embodiments, the environment characterization engine 350 generates portion(s) of the personalized audio content 272 derived from environmental sound content included in the source audio content. In alternate embodiments, the personalization application 270 may include any number of other components that perform any number and type of emotional conditioning operations on any amount of the source audio content in addition to or instead of the music parameterization engine 330, the voice agent parametrization engine 340, and the environment characterization engine 350.

For explanatory purposes only, operations for each of the parameterization engines are described herein for various embodiments in which the parameterization engine 270 is operating in the non-goal mode. As referred to herein, the "parameterization engines" include the music parameterization engine 330, the voice agent parameterization engine 340, and the environment parameterization engine 350. However, as persons skilled in the art will recognize, in alternate embodiments in which the parameterization engine 270 is operating in the goal mode, the behavior of any number of the parameterization engines may be modified based on the goal state 312, the initial state 314, and/or the goal status 316.

In general, when the personalization application 270 is operating in the goal mode, the goal engine 310 implements a portion of the emotional conditioning process. More specifically, the goal engine 310 performs emotional conditioning operations to determine the goal state 312. Consequently, in some alternate embodiments, the parameterization engines may generate the personalized audio content 272 that is designed to achieve the goal state 312. Notably, if the goal status 316 indicates that the personalized audio content 272(1) is not having the desired effect on the target occupant, then one or more of the parameterization engines may implement an alternative technique to generate the personalized audio content 272(1). Each of the parameterization engines may select the alternative technique in any technically feasible fashion. For example, a parameterization engine could select an alternative technique randomly or based on historical data associated with the target occupant and/or any number of other individuals.

As shown, the music parameterization engine 330 includes, without limitation, a playlist selector 332 and a content optimizer 334. In alternate embodiments, the music parameterization engine 330 may include any number of other components that perform any number and type of emotional conditioning operations on any amount of the source audio content in addition to or instead of the playlist selector 332 and the content optimizer 334.

The playlist selector 332 implements emotional conditioning techniques to select and subsequently identify one or more songs for sequential inclusion in the personalized audio content 272(1). For example, suppose the emotional state 252(1) indicates that the target occupant is happy. The playlist selector 332 could select one or more songs that historical data (not shown) indicate maintains the emotional state 252(1) of the target occupant when the target occupant is already happy.

The content optimizer 334 implements emotional conditioning techniques to parameterize the structure and/or contents of a source song included in the source audio content or that is to be included in the source audio content shortly (e.g., the next song in a compact disc). In general, the content optimizer 334 may detect the source song using any song recognition techniques as known in the art. In some embodiments, the content optimizer 334 may parameterize the source song to add, delete, and/or modify any number and type of musical components based on the emotional state 252(1). Examples of musical components include chords, harmonies, melodies, and musical material, to name a few. Subsequently, the personalization application 270 includes the parameterized song in the personalized audio content 272(1).

In the same or other embodiments, the content optimizer 334 may determine that one or more variations of the source song are available (e.g., are stored in the cloud 306). Common songs variations may include, without limitation, various levels of explicit lyrics, various types of arrangements (e.g., full, unplugged, etc.), various music genres, and so forth. The content optimizer 334 may then select one of the variations of the source song based on the emotional state 252(1). For example, if the emotional state 252(1) indicates that the target occupant is in a highly aggressive mood and the source song is a heavy metal song, then the content optimizer 334 could select a jazz variation of the source song. Further, the content optimizer 334 may parameterize the variation of the source song. Subsequently, the personalization application 270 includes the (parameterized) variation of the source song in the personalized audio content 272(1).

In some embodiments, the content optimizer 334 may implement any number any type of parameterization operations that are applicable to a source version associated with the source song. For example, if the source version is a multi-track version, then the content optimizer 334 may perform any number of on-the-fly re-mixing operations to generate a parameterized song based on the emotional state 242(1). Examples of re-mixing operations include, without limitation, emphasizing or de-emphasizing certain instruments, vocals, effects, and so forth. Re-mixing a multi-track version of a song computationally allows the same low-level control over the audio mix with all associated audio parameters as a mixdown session in a recording studio.

In another example, if the source version is a Musical Instrument Digital Interface (MIDI) version, then the content optimizer 334 may apply MIDI-based techniques (e.g MIDI synthesis operations) to generate a parameterized song based on the emotional state 242(1). As persons skilled in the art will recognize, MIDI enables full customization of a song, including compositional elements, instrument selection and arrangement, and instrument customization. Consequently, using common MIDI operations, the content optimizer 334 can re-mix a song on various levels. MIDI enables the content optimizer 334 to modify parameters of individual instrument synthesizers, such as changing the sound of an instrument. For example, the content optimizer 334 could change a clean saxophone sound to raspy saxophone sound or replace a saxophone with a tuba. As a general matter, songs which are represented as MIDI sequences and use synthesized or digitized instruments can be manipulated computationally in ways that prerecorded audio cannot. For example, using a MIDI version of a song, the content optimizer 334 can change the key of the song, change the tempo of the song (without changing the overall pitch of the song), reorder the individual sections of the song, and more. Subsequently, the personalization application 270 includes the parameterized song in the personalized audio content 272(1).

In the same or other embodiments, if the content optimizer 334 determines that a source version associated with the source song is not amenable to low-level parameterization, then the content optimizer 334 may select an alternate version of the song to parameterize. For example, if the source version is a stereo version, then the content optimizer 334 could locate a multi-track or a Musical Instrument Digital Interface (MIDI) version of the source song. The content optimizer 334 may locate an alternate version of the source song in any technically feasible fashion. For instance, as shown, the content optimizer 334 could locate a MIDI version of the source song that is stored in a MIDI database 382 included in the cloud 380.

In other embodiments, if the content optimizer 334 determines that the source song is not amenable to low-level parameterization, then the content optimizer 334 may perform any number of analysis and decomposition operations on the source song to generate a multi-track version of the source song. In particular, the content optimizer 334 may implement sound source separating techniques to separate instruments and then split the sources song into multiple tracks. The content optimizer 334 may then parameterize the multi-track version of the source song based on the emotional state 252(1). Subsequently, the personalization application 270 includes the (parameterized) multi-track version of the source song in the personalized audio content 272(1).

In various embodiments, the content optimizer 334 may limit the scope of the parameterization of a source song that is intended to be received by more than one occupant. For example, suppose that a particular source song is intended to be received by all of the occupants in the vehicle 100, and each of the sound zones 110 is not completely isolated from the other sounds zones 110. Because each occupant of the vehicle 100 is likely to overhear audio content intended for the other occupants of the vehicle 100, the content optimizer 334 may generate a single MIDI version of the source song and select a single tempo. Subsequently, for each of the occupants, the content optimizer 334 may generate a different parameterized song having the selected tempo based on the MIDI version of the source song and the emotional state 252 associated with the occupant.

The voice agent parameterization engine 340 performs emotional conditioning operations to parameterize the structure and/or contents of verbal content included in the source audio content or that is to be included in the source audio content shortly. Verbal content included in the source audio content or that is to be included in the source audio content shortly is also referred to herein as "source verbal content." More precisely, the voice agent parameterization engine 340 parameterizes source verbal content based on the emotional state 252(1) to generate parameterized verbal content that is included in the personalized audio content 272(1).

As shown, the voice agent parameterization engine 340 includes, without limitation, a speech synthesizer 342. The speech synthesizer 342 enables the parameterization engine 320 to perform low-level parametrization operations on portions of verbal content. In alternate embodiments, the voice agent parameterization engine 340 may include any number of other components that perform any number and type of operations on any amount of the source audio content in addition to or instead of any number of the speech synthesizers 342.

The voice agent parameterization engine 340 may implement any number and type of emotional conditioning techniques on source verbal content to generate parameterized voice content. In general, the voice agent characterization engine 320 may alter semantic characteristics and/or non-semantic characteristics of the source verbal content based on the emotional state 252(1). Some examples of semantic characteristics include, without limitation, word choice, discussion model structure, type of information delivered in a response to a query, and question initiation, to name a few.

Examples of the impact of word choice parameterization include, without limitation, replies to a query, dialog with the target occupant, and so forth. An example of the impact of discussion model structure parameterization is the type of follow-up questions the voice agent asks while interacting with the target occupant. Some examples of the impact of question initiation parameterization include, without limitation, whether the parameterized voice content includes questions initiated by a voice agent (e.g., a navigation system) and/or whether the voice agent participates in an ongoing dialog with the target occupant.

Examples of non-semantic characteristics include, without limitation, tone, frequency response, type of voice, type of the speech synthesizer 322, and so forth. For instance, in some embodiments, the voice agent parameterization engine 340 may parameterize an overall tempo, loudness, and pitch of a synthesized voice. In the same or other embodiments, the voice agent parameterization engine 340 may specify voice affect parameters.

Examples of voice affect parameters include, without limitation, pitch parameters, timing parameters, voice quality parameters, articulation parameters, etc. More specifically, examples of pitch parameters include, without limitation, accent shape, average pitch, contour slope, final lowering, and pitch range. Some examples of timing parameters include, without limitation, speech rate and stress frequency. Examples of voice quality parameters include, without limitation, breathiness, brilliance, laryngealization, loudness, pause discontinuity, pitch discontinuity, and the like. One example of an articulation parameter is precision.

In various embodiments, as part of generating the parameterized voice content, the voice agent parameterization engine 340 may insert or omit non-verbal and non-language vocalizations, such as paralinguistic respiration (e.g., laughs, coughs, whistles, etc.). Similarly, the voice agent parameterization engine 340 may insert or omit non-speech alerting sounds (e.g., beeps, chirps, clicks, etc.). In some embodiments, to impact the perceived emotional effect, the voice agent parameterization engine 340 may generate parameterized voice content that emphasizes soft or hard sounds, polysyllabic or abrupt rhythms, words with long vowels or diphthongs, and the like.

As a general matter, the voice agent parameterization engine 340 may implement any number and type of heuristics, rules, and/or machine learning algorithms to generate parameterized voice content that is included in the personalized audio content 272(1) based on any number of the emotional states 252. For instance, in some embodiment, the voice agent parameterization engine 340 may implement sound symbolism heuristics that connect particular sound sequences with particular meanings in speech.

The environment parameterization engine 350 performs emotional conditioning operations on environment source content to generate parameterized environment content that is included in the personalized audio content 272(1). To generate the parameterized environment content, the environment parameterization engine 350 may implement any number of noise cancellation, sound modification, and/or sound enhancement techniques. Note that the environment source content may include sounds that are delivered to the sound zones 110 associated with other occupants of the vehicle 100.

In some embodiments, to soothe the target occupant when the emotional state 252(1) indicates an agitated mood, the environment parametrization engine 320 may implement auditory masking, such as simultaneous masking and temporal masking. To implement simultaneous masking, the environment parameterization engine 320 may generate parameterized environmental content that includes white/pink noise. The white/pink noise is designed to mask undesirable sounds with the same frequency or frequencies that are emitted concurrently with the white/pink noise. To implement temporal masking, the environment parameterization engine 320 may include a predefined palette of pleasant sounds in the parameterized environment content. The noise-related content follows and includes similar frequency content as an undesirable sound, but at a higher volume.

In various embodiments, the environment parametrization engine 320 may alter warning and/or error noises based on the emotional state 252(1). For example, if the target occupant is an occupant in the vehicle 100, then the environment parametrization engine 320 may parameterize one or more warning chimes (e.g., door open, etc.). The environment parametrization engine 320 may parameterize the warning chimes based on any criteria, such as the emotional state 252(1) and/or the relevance of the chime to the target occupant.

For example, if the vehicle 100 is parked and the door closest to the target occupant is open, then the environment parametrization engine 320 may generate parameterized environment content that includes the unaltered warning chime. By contrast, suppose that the vehicle 100 is parked, a door across from the target occupant is open, and the emotional state 252(1) indicates that the target occupant is unhappy. In such a scenario, the environment parametrization engine 320 may generate parameterized environment content 272(1) that replaces the warning chime with a more soothing sound.

In various embodiments, the environment parametrization engine 320 may generate parameterized environment content that modifies and/or enhances desired source environment content generated from within one or more sound zones 110. For instance, in some embodiments, each of the sound zones 110 includes one or more microphones that are focused to pick up the speech content emitted by the occupant associated with the sound zone 110. If the emotional state 252(1) of the target occupant does not match the emotional state 252(x) of a "source occupant" associated with the sound zone 110(x), then the environment parametrization engine 320 may parameterize the speech content emitted by the source occupant to more closely match the emotional state 252(1).

After each of the parameterization engines generates parameterized content for inclusion in the personalized audio content 272(1), the personalization application 270 composites the parameterized content to generate the personalized audio content 272(1). The personalization application 270 may composite the parameterized content in any technically feasible fashion. For example, the personalization application 270 could generate an aggregate of the parameterized content. In another example, the personalization application 270 could generate a weighted aggregate of the parameterized content that includes parameterized voice content at a higher volume than parameterized music content.

Subsequently, the routing engine 360 configures any number of audio devices associated with the sound zone 110(1) to deliver the personalized audio content 272(1) to the target occupant. The routing engine 360 may identify and configure the audio devices in any technically feasible fashion. For instance, in some embodiments, the routing engine 360 may identify an earbud that is associated with the target occupant and transmit the personalized audio content 272(1) to the earbud. In other embodiments, the routing engine 360 may interface with an application programming interface (API) included in an audio delivery application that controls different sound zones 110 via any number of speakers.

In general, any amount of the functionality associated with the personalization application 270 may be implemented in a stand-alone fashion or integrated in any other application (e.g., an infotainment system) in any technically feasible fashion. Further, the functionality associated with the personalization application 270 may be divided across any number of applications that are stored in any number and type of memories and executed via any number of processors 212. The memories and the processors 212 may be located in any number of physical positions.

Note that the techniques described herein are illustrative rather than restrictive, and may be altered without departing from the broader spirit and scope of the contemplated embodiments. Many modifications and variations on the functionality provided by the personalization application 270 will be apparent to those of ordinary skill in the art without departing from the scope and spirit of the described embodiments. For instance, in alternate embodiments, the vehicle 100 includes a single sound zone 110 that is associated with all the occupants of the vehicle 100, and the personalization application 270 may generate a single audio content based on the emotional states 252 of all of the occupants.

It will be appreciated that the personalization application 270 shown herein is illustrative and that variations and modifications are possible. For instance, in alternative embodiments, the personalization application 270 may include an advertising application. For each occupant of the vehicle 100, the advertising application may generate parameterized advertising content based on the emotional state 252 associated with the occupant. Subsequently, for each occupant, the personalization application 270 may include the parameterized advertising content in the personalized audio content 272 associated with the occupant.

For explanatory purposes only, the mood zone subsystem 240 and the personalization application 270 have thus far been described in the context of the vehicle 100. As persons skilled in the art will recognize, in alternate embodiments, the mood zone subsystem 240 and the personalization application 270 may control any type of audio system that provides any number of sound zones 110 located in any type of space. Accordingly, in alternate embodiments, the mood zone subsystem 240 and the personalization application 270 may deliver different personalized audio content 272 to any number of different co-located individuals that are not in the vehicle 100 simultaneously based on the emotional states 252 of the individuals. Individuals are also referred to herein as users.

For instance, the mood zone subsystem 240 and the personalization application 270 may deliver the personalized audio content 272 to occupants of cars, buses, airplanes, boats, space ships, autonomous transportation systems, etc. Further, the mood zone subsystem 240 and the personalization application 270 may deliver the personalized audio content 272 to any number of co-located individuals located in waiting rooms, restaurants, amusement parks, museums etc. For example, an audio system deployed at the registry of motor vehicles may include a different sound zone 110 at each kiosk within a single room. For each kiosk and at any given time, the mood zone subsystem 240 and the personalization application 270 may deliver the personalized audio content 272 that specifies instructions relevant to the kiosk based on the emotional states 252 of the individual(s) located at the kiosk.

Figure 4:
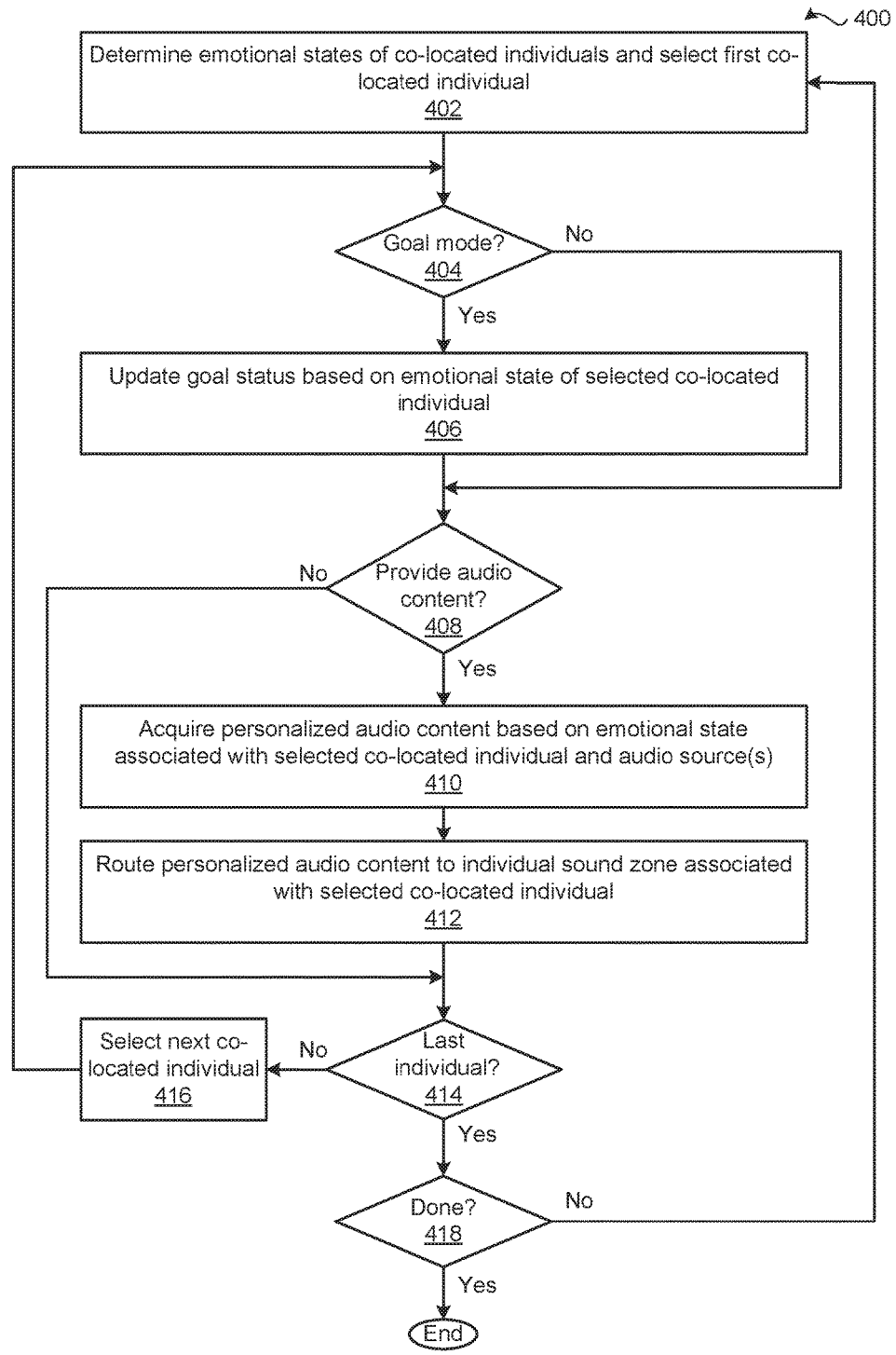
FIG. 4 is a flow diagram of method steps for providing personalized audio content, according to various embodiments.

FIG. 4 is a flow diagram of method steps for providing personalized audio content, according to various embodiments. Although the method steps are described in conjunction with the systems of FIGS. 1-3, persons skilled in the art will understand that any system configured to implement the method steps, in any order, falls within the scope of the contemplated embodiments. The context of FIG. 4 is that multiple individuals are co-located and, for each of the co-located individuals, any number of audio devices may be configured to provide the associated individual sound zone 110.

As shown, a method 400 begins at step 402, where the personalization application 270 determines the emotional states 252 associated with the co-located individuals. The personalization application 270 may determine the emotions states 252 in any technically feasible fashion. In some embodiments, the personalization application 270 may receive the emotional states 252 from the emotion classifier 250. In other embodiments, the personalization application 270 may identify the emotional states 252 in any technically feasible fashion based on any amount of relevant data. The personalization application 270 then selects the first co-located individual.

At step 404, the personalization application 270 determines whether the personalization application 270 is operating in a goal mode. In various embodiments, the personalization application 270 may operate exclusive in a goal mode, exclusively in a non-goal mode, or selectively in a goal mood based on any technically feasible criterion (e.g., a configuration setting). If, at step 404, the personalization application 270 determines that the personalization application 270 is operating in a goal mode, then the method 400 proceeds to step 406.

At step 406, the goal engine 310 updates the goal status 316 associated with the selected co-located individual based on the emotional state 252 associated with the individual. In general, the goal status 316 indicates whether the personalization application 270 is successfully transitioning the emotional state 252 associated with the selected co-located individual from the initial state 314 to the goal state 312. As part of updating the goal status 316, the goal engine 310 may generate the goal state 312 and the initial state 314. In general, the goal engine 310 may generate the goal state 312, initial state 314, and goal status 316 in any technically feasible fashion based, at least in part, on the emotional state 252 associated with the selected co-located individual.

For instance, in some embodiments, the goal engine 310 may generate the goal state 312 for the selected co-located individual based on the emotional state 252 associated with the individual. In other embodiments, the goal engine 310 may generate the goal state 312 that is associated with multiple co-located individuals based on the emotional states 252 associated with the co-located individuals.

If, however, at step 404, the personalization application 270 determines that the personalization application 270 is not operating in a goal mode, then the method 400 proceeds directly to step 408. At step 408, the gating engine 320 determines whether the audio system 100 is to provide audio content to the selected co-located individual. If, at step 408, the gating engine 320 determines that the audio system 100 is to provide audio content to the selected co-located individual, then the method 400 proceeds to step 410.

At step 410, the personalization application 270 acquires the personalized audio content 272 associated with the selected co-located individual based on the emotional state 252 associated with the co-located individual and, optionally, any number of the audio sources 260. The personalization application 270 may acquire the personalized audio content 272 in any technically feasible fashion. Further, when the personalization application 270 is operating in the goal mode, the personalization application 270 may acquire the personalized audio content 272 based on techniques that take into consideration the goal state 312, the initial state 314, and/or the goal status 316. In some embodiments, as described in greater detail in conjunction with FIG. 3, the personalization application 270 implements different techniques to acquire portion(s) of the personalized audio content 272 derived from different types of source audio content received from the audio source(s) 260.

At step 412, the routing engine 360 configures any number of audio devices associated with the selected co-located individual to deliver the personalized audio content 272 associated with the selected co-located individual to the selected co-located individual. The routing engine 360 may identify and configure the audio devices in any technically feasible fashion. For instance, in some embodiments, the routing engine 360 may identify an earbud that is associated with the selected co-located individual and transmit the personalized audio content 272 associated with the selected co-located individual to the earbud. In other embodiments, the routing engine 360 may interface with an application programming interface (API) of an audio delivery application that controls different sound zones 110 via any number of speakers.

Returning now to step 408, if the gating engine 320 determines that the audio system 100 is not to provide audio content to the selected co-located individual, then the method 400 proceeds directly to step 414. At step 414, the personalization application 270 determines whether the selected co-located individual is the last co-located individual. If, at step 414, the personalization application 270 determines that the selected co-located individual is not the last co-located individual, then the method 400 proceeds to step 416. At step 416, the personalization application 270 selects the next co-located individual, and the method 400 returns to step 404, where the personalization application 370 personalizes the audio content received from the audio source(s) 260 for the newly selected co-located individual.

If, however, at step 414, the personalization application 270 determines that the selected co-located individual is the last co-located individual, then the method 400 proceeds directly to step 418. At step 418, the personalization application 270 determines whether the personalization application 270 is to cease executing. For example, the personalization application 270 could determine whether or not the audio system 100 has been turned off. If, at step 418, the personalization application 270 determines that the personalization application 270 is to continue executing, then the method 400 returns to step 402, where the personalization application 270 receives updated emotional states 252 associated with the co-located individuals. If, however, at step 420, the personalization application 270 determines that the personalization application 270 is to cease executing, then the method 400 terminates.

For explanatory purposes only, the method 400 describes steps 404-412 as occurring sequentially for each co-located individual. However, in various embodiments, the steps 404-412 may occur concurrently, sequentially, or any combination thereof for any number of the co-located individuals. Further, the personalization application 270 may receive, request, and/or process updated emotional states 252 and/or source audio content continually, at discrete intervals, or in respond to any number and type of criteria. For example, the personalization application 270 could receive updated emotional states 252 when the emotional classifier 250 detects a change in one or more of the emotional states 252. In another example, the personalization application 270 could receive new source audio content when a selected radio station finishes playing a song.

In sum, the disclosed techniques may be used to personalize audio content for multiple co-located individuals (e.g., occupants of a vehicle, customers in a waiting room, etc.). A personalization application includes, without limitation, a gating engine, a music parametrization engine, a speech parametrization engine, an environment parametrization engine, and a routing engine. In operation, for each individual, the personalization application receives an emotional state from an emotional classifier. The gating application determines whether each individual is to receive audio content based on the emotional state of the individual. Subsequently, for each individual that is to receive audio content, any number and combination of the music parametrization engine, the speech parametrization engine, and the environment parametrization engine acquire parameterized content based on source audio content and the emotional state of the individual. For each individual that is to receive audio content, the personalization application then composites the parameterized content to generate the personalized audio content associated with the individual. Finally, for each individual that is to receive audio content, the routing engine delivers the corresponding personalized audio content to audio device(s) that provide an individual sound zone for the individual.

Advantageously, because the personalization application automatically generates the personalized audio content based on the emotional states of the individuals, both the enjoyment and safety of individuals may be reliably increased. Notably, each individual is not required to make oftentimes tedious manual selections to optimize their own listening experience. In particular, the personalization application may effectively optimize the listening experience of an individual who is unaware of their emotional state and/or how to improve their own emotional state (e.g., a drowsy driver). Further, the personalization application may modify content using a variety of techniques (e.g., replacing a stereo version of a song with a MIDI version of the song, etc.) that may not be available to individuals via manual selections.

1. In some embodiments, a method for providing personalized audio content comprises acquiring first personalized audio content that is based on a first emotional state associated with a first user; causing a first audio device associated with the first user to output the first audio content; and causing a second audio device associated with a second user that is co-located with the first user to output second audio content while the first audio device outputs the first audio content, wherein the second audio content is different from the first audio content.

2. The method of clause 1, further comprising acquiring the second personalized audio content, wherein the second personalized audio content is based on a second emotional state associated with the second user.

3. The method of clauses 1 or 2, wherein the first user and the second user are occupants of a vehicle.

4. The method of any of clauses 1-3, wherein the first audio device comprises at least one of an earbud and a speaker.

5. The method of any of clauses 1-4, wherein the first personalized audio content includes at least one of musical content, speech content, and noise cancellation content.

6. The method of any of clauses 1-5, wherein acquiring the first personalized audio content comprises determining that first source audio content is targeted for output to the first user, and modifying a first characteristic of the first source audio content based on the first emotional state to generate the first personalized audio content.

7. The method of any of clauses 1-6, wherein the first characteristic comprises a frequency characteristic, a musical arrangement selection, an instrument selection, a pitch, a word choice, a type of information, a tone of voice, or a type of voice.

8. The method of any of clauses 1-7, wherein acquiring the first personalized audio content comprises determining that a first version of a first song is targeted for output to the first user; acquiring a second version of the first song, wherein the second version of the first song comprises a multi-track version of the first song or a Musical Instrument Digital Interface (MIDI) version of the first song; and performing one or more audio operations on the second version of the first song based on the first emotional state.

9. The method of any of clauses 1-8, further comprising determining the first emotional state based on at least one of image data, biological data, auditory data, tactile data, and electronic activity data.

10. The method of any of clauses 1-9, wherein acquiring the first personalized audio content comprises determining a goal emotional state based on the first emotional state and modifying first source audio content targeted for output to the first user based on the goal emotional state to generate the first personalized audio content.

11. In some embodiments, a non-transitory computer-readable storage medium includes instructions that, when executed by a processor, cause the processor to provide personalized audio content by performing the steps of acquiring first personalized audio content based on a first emotional state associated with a first user; acquiring second personalized audio content based on a second emotional state associated with a second user that is co-located with the first user; causing a first audio device associated with the first user to output the first audio content; and causing a second audio device associated with the second user to output the second audio content while the first audio device outputs the first audio content.

12. The computer-readable storage medium of clause 11, wherein acquiring the first personalized audio content comprises determining that first source audio content is targeted for output to the first user, and modifying a first characteristic of the first source audio content based on the first emotional state to generate the first personalized audio content.

13. The computer-readable storage medium of clauses 11 or 12, wherein acquiring the second personalized audio content comprises determining that the first source audio content is also targeted for output to the second user, and modifying at least one of the first characteristic and a second characteristic of the first source audio content based on the second emotional state to generate the second personalized audio content.

14. The computer-readable storage medium of any of clauses 11-13, wherein acquiring the second personalized audio content comprises determining that second source audio content is targeted for output to the second user, and modifying at least one of the first characteristic and a second characteristic of the second source audio content based on the second emotional state to generate the second personalized audio content.

15. The computer-readable storage medium of any of clauses 11-14, wherein acquiring the first personalized audio content comprises detecting that a first version of a first song is targeted for output to the first user, and selecting a second version of the first song based on the first emotional state.

16. The computer-readable storage medium of any of clauses 11-15, wherein the first user and the second user are occupants of a vehicle.

17. The computer-readable storage medium of any of clauses 11-16, wherein the first audio devices comprise at least one of an earbud and a speaker.

18. The computer-readable storage medium of any of clauses 11-17, wherein the first personalized audio content includes at least one of musical content, speech content, and noise cancellation content.

19. In some embodiments, a system for providing personalized audio content comprises a memory storing a personalization application; and a processor coupled to the memory, wherein, when executed by the processor, the personalization application causes the processor to for a first user included in a plurality of co-located users, determine an emotional state associated with the first user; for the first user, acquire first personalized audio content based on the emotional state and source audio content; cause a first audio device associated with the first user to output the first personalized audio content; and cause a second audio device associated with a second user included in the plurality of co-located users to output the source audio content or second personalized audio content that is different from the first personalized audio content while the first audio device outputs the first audio content.

20. The system of clause 19, wherein the plurality of co-located users are occupants of a vehicle.

Any and all combinations of any of the claim elements recited in any of the claims and/or any elements described in this application, in any fashion, fall within the contemplated scope of the present invention and protection The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for providing personalized audio content, the method comprising:
    determining, via one or more processors, a first emotional state associated with a first user based on sensor data from one or more sensors;
    determining that a first version of first source audio content is targeted for output to the first user;
    acquiring a second version of the first source audio content, wherein the second version of the first source audio content comprises a multi-track version of the first source audio content or a Musical Instrument Digital Interface (MIDI) version of the first source audio content;
    performing one or more audio operations on the second version of the first source audio content based on the first emotional state to generate first personalized audio content;
    causing a first audio device associated with the first user to output the first personalized audio content; and
    causing a second audio device associated with a second user that is co-located with the first user to output second audio content while the first audio device outputs the first personalized audio content, wherein the second audio content is different from the first personalized audio content.

2. The method of claim 1, further comprising acquiring the second audio content, wherein the second audio content is based on a second emotional state associated with the second user.

3. The method of claim 1, wherein the first user and the second user are occupants of a vehicle.

4. The method of claim 1, wherein the first audio device comprises at least one of an earbud and a speaker.

5. The method of claim 1, wherein the first personalized audio content includes at least one of musical content, speech content, and noise cancellation content.

6. The method of claim 1, wherein performing one or more audio operations on the second version of the first source audio content comprises modifying a first characteristic of the second version of the first source audio content based on the first emotional state to generate the first personalized audio content.

7. The method of claim 6, wherein the first characteristic comprises a frequency characteristic, a musical arrangement selection, an instrument selection, a pitch, a word choice, a type of information, a tone of voice, or a type of voice.

8. The method of claim 1, further comprising determining the first emotional state based on at least one of image data, biological data, auditory data, tactile data, and electronic activity data.

9. The method of claim 1, wherein performing one or more audio operations on the second version of the first source audio content comprises determining a goal emotional state based on the first emotional state and modifying the second version of the first source audio content based on the goal emotional state to generate the first personalized audio content.

10. One or more non-transitory computer-readable storage media including instructions that, when executed by one or more processors, cause the one or more processors to provide personalized audio content by performing the steps of:
  determining, via one or more processors, a first emotional state associated with a first user based on sensor data from one or more sensors;
  determining that a first version of first source audio content is targeted for output to the first user;
  acquiring a second version of the first source audio content, wherein the second version of the first source audio content comprises a multi-track version of the first source audio content or a Musical Instrument Digital Interface (MIDI) version of the first source audio content;
  performing one or more audio operations on the second version of the first source audio content based on the first emotional state to generate first personalized audio content;
  acquiring second personalized audio content based on a second emotional state associated with a second user that is co-located with the first user;
  causing a first audio device associated with the first user to output the first personalized audio content; and
  causing a second audio device associated with the second user to output the second personalized audio content while the first audio device outputs the first personalized audio content.

11. The one or more computer-readable storage media of claim 10, wherein performing one or more audio operations on the second version of the first source audio content comprises modifying a first characteristic of the second version of the first source audio content based on the first emotional state to generate the first personalized audio content.

12. The one or more computer-readable storage media of claim 11, wherein acquiring the second personalized audio content comprises determining that the first source audio content is also targeted for output to the second user, and modifying at least one of the first characteristic and a second characteristic of the first source audio content based on the second emotional state to generate the second personalized audio content.

13. The one or more computer-readable storage media of claim 11, wherein acquiring the second personalized audio content comprises determining that second source audio content is targeted for output to the second user, and modifying at least one of the first characteristic and a second characteristic of the second source audio content based on the second emotional state to generate the second personalized audio content.

14. The one or more computer-readable storage media of claim 10, wherein acquiring the second version of the first source audio content comprises selecting the second version of the first source audio content based on the first emotional state.

15. The one or more computer-readable storage media of claim 10, wherein the first user and the second user are occupants of a vehicle.

16. The one or more computer-readable storage media of claim 10, wherein the first audio devices comprise at least one of an earbud and a speaker.

17. The one or more computer-readable storage media of claim 10, wherein the first personalized audio content includes at least one of musical content, speech content, and noise cancellation content.

18. A system for providing personalized audio content, the system comprising:
  a memory storing a personalization application; and
  a processor coupled to the memory, wherein, when executed by the processor, the personalization application causes the processor to:
    for a first user included in a plurality of co-located users, determine an emotional state associated with the first user based on sensor data from one or more sensors;
    for the first user, determine a goal emotional state based on the emotional state associated with the first user and modify first source audio content targeted for output to the first user based on the goal emotional state to generate first personalized audio content;
    cause a first audio device associated with the first user to output the first personalized audio content; and
    cause a second audio device associated with a second user included in the plurality of co-located users to output the source audio content or second personalized audio content that is different from the first personalized audio content while the first audio device outputs the first personalized audio content.

19. The system of claim 18, wherein the plurality of co-located users are occupants of a vehicle.

* * * * *